United States Patent
Chiba

[11] Patent Number: 5,817,236
[45] Date of Patent: Oct. 6, 1998

[54] FILTER AND FILTER MEDIUM UNIT FOR USE THEREIN

[75] Inventor: Masatoshi Chiba, Hamakita, Japan

[73] Assignee: Toyo Roki Seizo Kabushiki Kaisha, Hamakita, Japan

[21] Appl. No.: 784,914

[22] Filed: Jan. 16, 1997

[30] Foreign Application Priority Data

Feb. 1, 1996 [JP] Japan ................................ 8-016522
Jun. 7, 1996 [JP] Japan ................................ 8-145745

[51] Int. Cl.$^6$ .................................................. B01D 35/02
[52] U.S. Cl. ........................... 210/344; 210/445; 210/455
[58] Field of Search .................................... 210/168, 344, 210/445, 455, 492

[56] References Cited

U.S. PATENT DOCUMENTS

| | | |
|---|---|---|
| 4,450,081 | 5/1984 | Anderson et al. . |
| 5,049,274 | 9/1991 | Leason et al. . |
| 5,538,633 | 7/1996 | Kitajima et al. ........................ 210/445 |

FOREIGN PATENT DOCUMENTS

| | | |
|---|---|---|
| 0 440 352 A2 | 8/1991 | European Pat. Off. . |
| 0 659 459 A2 | 6/1995 | European Pat. Off. . |
| 915 341 | 1/1963 | United Kingdom . |

*Primary Examiner*—Matthew O. Savage
*Attorney, Agent, or Firm*—Armstrong, Westerman, Hattori, McLeland & Naughton

[57] ABSTRACT

A filter suitable for automobile oil filter includes a housing with a pair of casings connected together with open ends facing each other and having respective communicating ports, a partition wall interposed between the open ends of the casings and having a peripheral edge held between the peripheral edges of the casings and first and second through holes, and a filter medium unit including a first filter medium having a first communicating hole corresponding to the first through hole of the partition wall and a second filter medium having a second communicating hole corresponding to the second through hole of the partition wall. The first filter medium is held between the peripheral edges of the casings together with the peripheral edge of the partition wall at one of two sides of the partion wall so that the first through hole and the first communicating hole are laid each one upon the other and so that a peripheral edge of the first filter medium adheres closely to the side of the partition wall. The second filter medium is held between the peripheral edges of the casings together with the peripheral edge of the partition wall at the other side of the partition wall so that the second through hole and the second communicating hole are laid each one upon the other and so that a peripheral edge of the second filter medium adheres closely to the side of the partition wall.

6 Claims, 15 Drawing Sheets

Prior Art

Prior Art

FILTER AND FILTER MEDIUM UNIT FOR USE THEREIN

BACKGROUND OF THE INVENTION

1. Field of the Invention

This invention relates to a filter suitable for use as oil filters for automobiles and a filter medium unit used therein.

2. Description of the Prior Art

FIGS. 6 and 7 illustrate a known filter of the above-described type. The filter comprises an upper casing 1 and a lower casing 2 each formed into the shape of a shallow dish and forming a housing 3. The upper and lower casings 1 and 2 are formed with an outlet port 1a and an inlet port 2a respectively. A filter medium 4 is configured to correspond with open ends of the casings 1 and 2. The open ends of the casings 1 and 2 are disposed to face each other with a filter medium 4 being interposed therebetween. The open edges of the casings 1 and 2 are flanged so that a peripheral edge of the filter medium 4 is held between the flanges. The peripheral edge of the upper casing 1 is crimped so as to enfold the peripheral edge of the lower casing 2. As a result, a continuous communicating path extending from the inlet port 2a across the filter medium 4 to the outlet port 1a is established in the housing 3.

The filter, as constructed above is disposed in an oil pan, for example, and an oil pump is connected to the outlet port 1a so that fouled oil in the oil pan is drawn in through the inlet port 2a. The drawn oil passes through the filter medium 4 to thereby be filtered, exiting through the outlet port 1a. In this construction, a filtration area which is one of factors determining a life period of the filter is only equal to a sectional area of the housing 3 when the filter medium 4 is usually flat. This poses a problem.

On the other hand, resin casings of the filters have recently been put to practical use. In the filters having the resin casings, the peripheral edge of the filter medium is held between the peripheral edges of the upper and lower casings by means of welding. FIG. 18 illustrates a prior art filter of this type. As shown, peripheral edges of two filter media 201 and 202 are placed between upper and lower casings 203 and 204. The upper and lower casings 203 and 204 are secured to each other by means of vibration welding with the filter media 201 and 202 being held therebetween.

In the vibration welding, the two filter media 201 and 202 are placed to directly face each other and are rubbed together. Since the filter media 201 and 202 are formed of a fibrous material, fibers of the media are pressed against each other when the media are rubbed together, whereupon the vibration welding disadvantageously results in fuzz of the fibrous material.

SUMMARY OF THE INVENTION

Therefore, an object of the present invention is to provide a filter which can provide a larger filtration area.

To achieve the object, the present invention provides a filter comprising a housing including a pair of casings having respective open ends and connectable together with the open ends thereof facing each other, the casings having peripheral edges and communicating ports formed in portions thereof except for the open ends respectively so as to communicate with the exterior so that a continuous communicating path is formed in the housing, a partition plate interposed between the open ends of the casings and having a peripheral edge held between the peripheral edges of the casings, the partition plate having first and second through holes, and a filter medium unit including a first filter medium having a first communicating hole corresponding to the first through hole of the partition wall and a second filter medium having a second communicating hole corresponding to the second through hole of the partition plate, the first filter medium being held between the peripheral edges of the casings together with the peripheral edge of the partition plate at one of two sides of the partion plate so that the first through hole and the first communicating hole are laid each one upon the other and so that a peripheral edge of the first filter medium adheres closely to the side of the partition plate, the second filter medium being held between the peripheral edges of the casings together with the peripheral edge of the partition plate at the other side of the partition plate so that the second through-hole and the second communicating hole are laid each one upon the other and so that a peripheral edge of the second filter medium adheres closely to the side of the partition plate.

According to the above-described filter, the casings connectable together with the open ends facing each other are provided with the respective communicating ports each communicating with the exterior along with the respective open ends. The continuous communicating path is formed between the communicating ports in the housing. When a pump is connected to one of the communicating ports to be operated, oil or other fluid is caused to flow through the other communicating port and the communicating path to said one communicating path. The partition plate having the first and second through holes is interposed between the casings. The oil passes through either one of the through holes. The first filter medium covers one of two sides of the partition plate except for the first through hole, whereas the second filter medium covers the other side of the partition plate except for the second through hole. Accordingly, the oil passes through the second filter medium when flowing through the first through hole, and it passes through the first filter medium when flowing through the second through hole. Thus, the oil flowing through both communicating ports passes through either one of the first and second filter media disposed at the respective sides of the partition plate. Consequently, the filtration area is approximately twice as large as the sectional area of the housing except for the first and second through holes.

The present invention also provides a filter medium unit disposed across a communicating path, comprising a partition plate having first and second through holes, a first filter medium having a first communicating hole corresponding to the first through hole of the partition plate, the first filter medium having a peripheral edge adhering closely to a peripheral edge of the partition plate at one of two sides of the partition plate so that the first through hole and the first communicating hole are laid each one upon the other, and a second filter medium having a second communicating hole corresponding to the second through hole of the partition plate, the second filter medium having a peripheral edge adhering closely to the peripheral edge of the partition plate at the other side of the partition plate so that the second through hole and the second communicating hole are laid each one upon the other.

According to the above-described filter medium unit, the oil is filtered by the second filter medium when flowing through the first through hole, whereas it is filtered by the first filter medium when flowing through the second through hole. Consequently, the filtration area is approximately twice as large as the sectional area of the partition plate disposed across the communicating path, except for the first and second through holes.

The present invention further provides a filter including a pair of casings constituting a housing in which a filter medium unit is disposed across the interior thereof, the housing providing a communicating path. The filter comprises a partition plate interposed between the casings and having a pair of through holes, the filter medium unit including a first filter medium covering one of two sides of the partition plate except for one of the through holes and a second filter medium covering the other side of the partition plate except for the other through hole.

According to the above-described filter, the first and second filter media are also disposed at the respective sides of the partition plate across the communicating path in the housing. When passing through one of the through holes at one side of the partition plate, the oil is filtered by the filter medium at the other side of the partition plate. When passing through the other through hole, the oil is filtered by the filter medium at said one side of the partition plate. Consequently, the filtration area is approximately twice as large as the sectional area of the housing except for the first and second through holes.

According to the present invention, the oil, or the like, passes through either one of the two filter media disposed across the communicating path in the filter housing. Since an approximately double filtration area is obtained, the life period of the filter can be improved.

Another object of the present invention is to provide a filter in which the fuzz of the fibrous material can be restrained.

To achieve this object, the present invention provides a filter comprising a housing including a pair of casings having outlet and inlet ports respectively, the casings having respective open ends and connected together by means of a vibration welding so that the open ends thereof face each other, a plurality of filter media having respective edges held between the open ends of the casings so as to be disposed across a flow path for a fluid to be filtered extending between the outlet and inlet ports, and a plurality of holding plates disposed between the edges of the filter media.

According to the above-described filter, a plurality of filter media are placed between the open ends of the casings in the assemblage of the filter. Furthermore, a plurality of holding plates are each held between each filter medium and the adjacent filter medium. The filter media are held between the casings and the holding plates when the casings are vibrated for the vibration welding. Consequently, since the filter media are prevented from being directly rubbed together, the fuzz of fibrous material for the filter media can be restrained. Furthermore, when a liquid to be filtered is caused to flow through the filter media between the inlet and outlet ports, dust is eliminated from the liquid. In this case, since the filter media are not rendered fuzzy, scattered fibers can be prevented from flowing out with the liquid.

A further another object of the present invention is to provide a filter in which displacement between the holding plates and the filter media can be prevented.

To achieve the object, the present invention provides a filter wherein each holding plate is formed with rubbed faces at portions thereof facing the filter media.

According to the above-described filter, the rubbed-faces are formed on the portions of the surface of each holding plate facing the filter media. The rubbed faces are pressed against the filter media to thereby bite into them when the filter media are held between the holding plates. Consequently, relative displacement between the holding plates and the filter media can be prevented. Furthermore, since chafing means need not be provided on the edge surfaces of the casings, the filter can be rendered simple in configuration.

Another further object of the present invention is to provide a filter wherein the filter media can be prevented from being subjected to an excessive force when the casings are vibrated for the vibration welding.

To achieve the object, the present invention provides a filter wherein each holding plate in the form of a partition plate and a peripheral edge of each casing have opposite faces formed with respective meshing engagement portions for preventing falling-off of each filter medium in cooperation with each other.

According to the above-described filter, the holding plates and the peripheral edges of the casings hold the filter media in the meshing engagement therebetween. Consequently, relative displacement between the holding plates and the filter media can be prevented. Furthermore, since an amount of displacement of the casings is rendered smaller than an amount of displacement of the holding plate or plates and the casings, the filter media can be prevented from being subject to an excessive force.

BRIEF DESCRIPTION OF THE DRAWINGS

Other objects, features and advantages of the present invention become clear upon reviewing the following description of preferred embodiments thereof, made with reference to the accompanying drawings, in which.

DETAILED DESCRIPTION OF THE PREFERRED EMBODIMENTS

Figure 1:
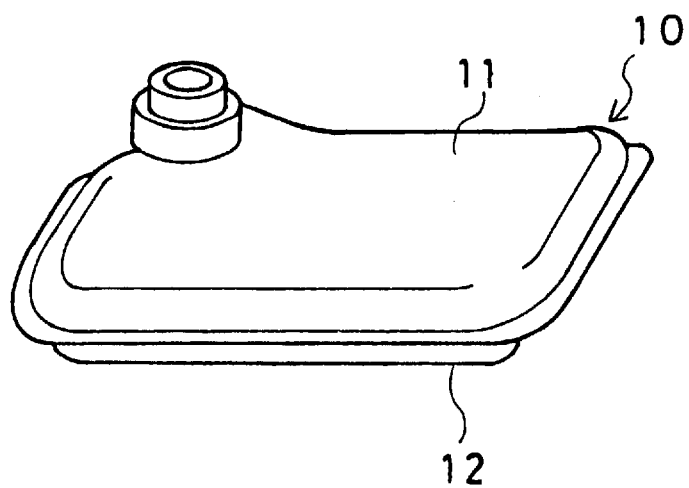
FIG. 1 is a perspective view of a filter of a first embodiment in accordance with the present invention.
Figure 2:
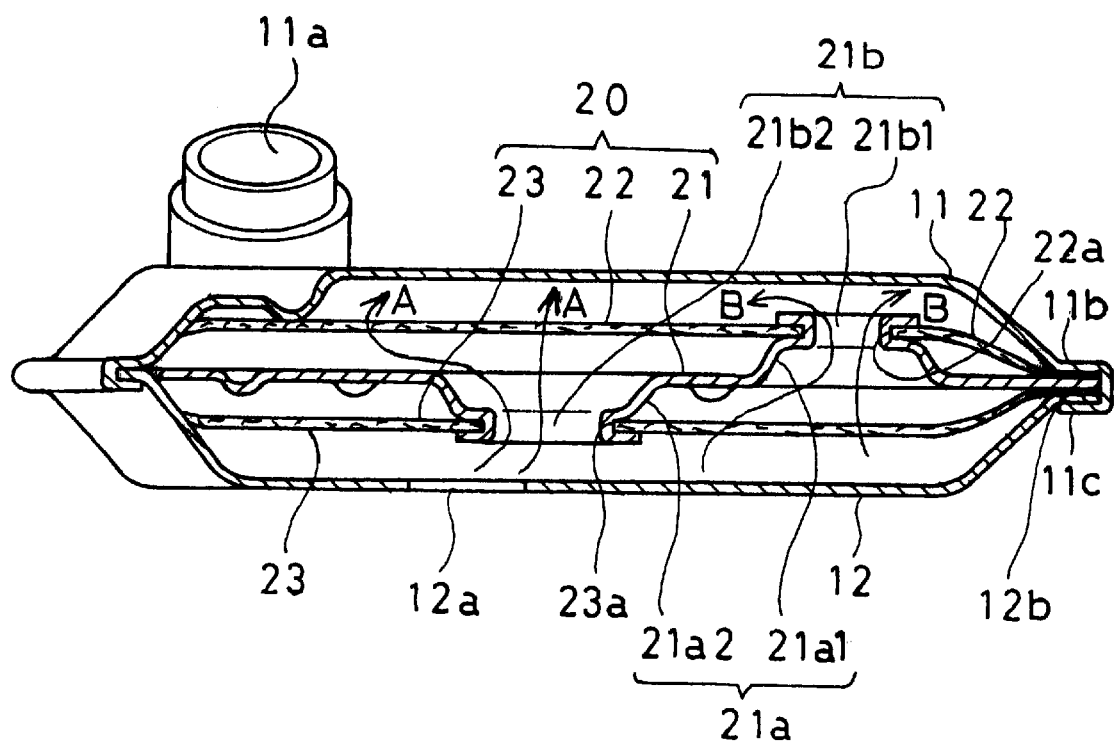
FIG. 2 is a partially broken side section of the filter.
Figure 3:
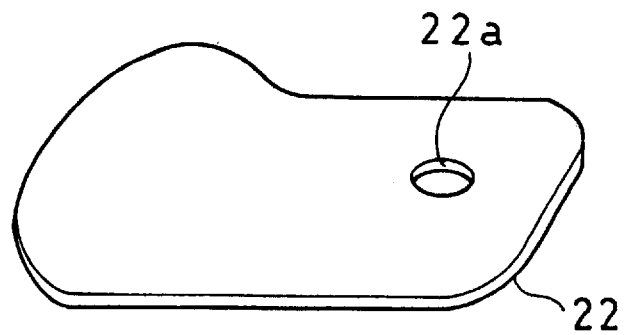
FIG. 3 is an exploded perspective view of a filter medium unit used in the filter.
Figure 3:
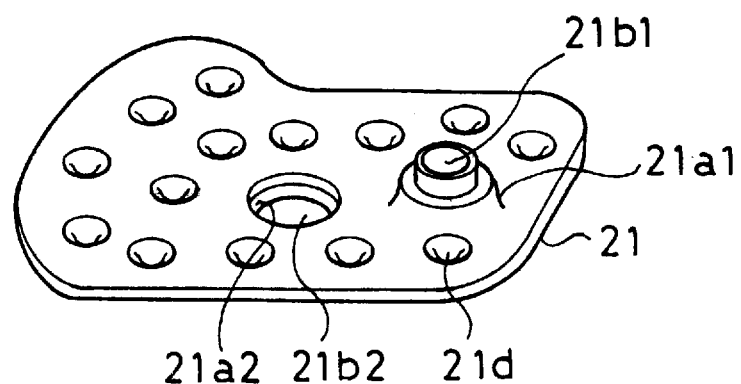
Figure 3:
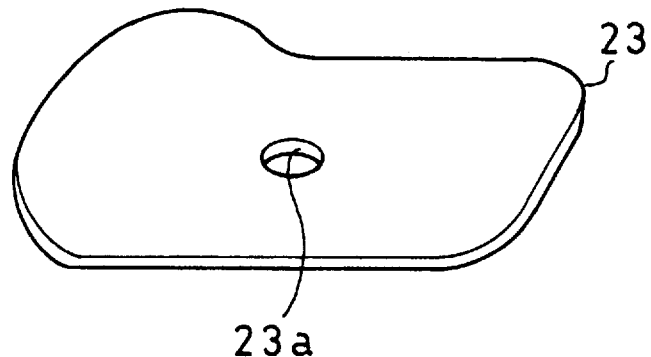
Figure 4:
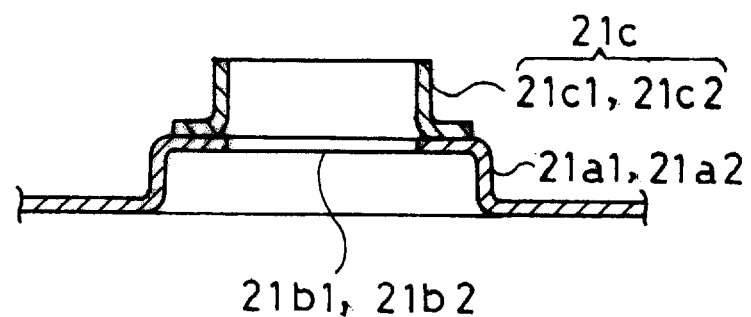
FIG. 4 is a partial sectional view of the filter medium, showing an assemblage step of the filter medium.

A first embodiment of the present invention will be described with reference to FIGS. 1 to 5. Referring to FIG.

1, the filter of the first embodiment in accordance with the present invention is shown. A steel housing 10 of the filter comprises upper and lower casings 11 and 12 each formed into the shape of a shallow dish. The casings 11 and 12 are connected together so that the housing 10 has a hollow interior. The upper and lower casings 11 and 12 are formed with outlet and inlet ports 11a and 12a respectively. A continuous communicating path is provided between the inlet and outlet ports 12a and 11a in the housing 10. The lower casing 12 has a flange 12b which is formed on a peripheral edge thereof to extend outwardly in a coplanar relation with an open end face thereof. The upper casing 11 also has a flange 11b formed in the same manner as the flange 12b. The flange 11b has a short cylindrical crimped portion 11c extending from the distal end thereof toward the lower casing 12 facing the upper casing 11. The flange 12b of the lower casing 12 is inserted into the crimped portion 11c to be opposed to the flange 11b. Thereafter, the crimped portion 11c is crimped inwardly such that the upper and lower casings 11 and 12 are connected together with the open end faces facing each other.

The upper and lower casings 11 and 12 are connected together to constitute the generally thin box-shaped housing 10 in the embodiment. However, the housing 10 may be formed into any shape, provided that the communicating path is formed therein. For example, the housing 10 may be formed into the shape of an elongated cylinder. Furthermore, the housing 10 may be formed of a suitable resin, instead of steel. In case that the housing 10 is formed of a resin, the flange of the upper casing 11 cannot be crimped as described above. The flange may be secured to the flange 12a of the lower casing 12 by means of welding or by screws, instead. Furthermore, a filter medium unit 20 may constitute a part of the side plate of the housing 10.

Figure 5:
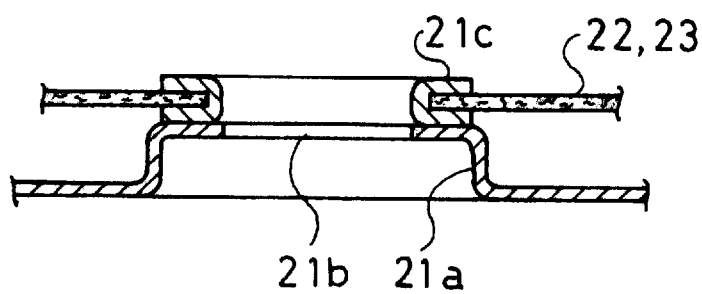
FIG. 5 is a partial sectional view of the filter medium, showing a completed state of the filter medium.
Figure 6:
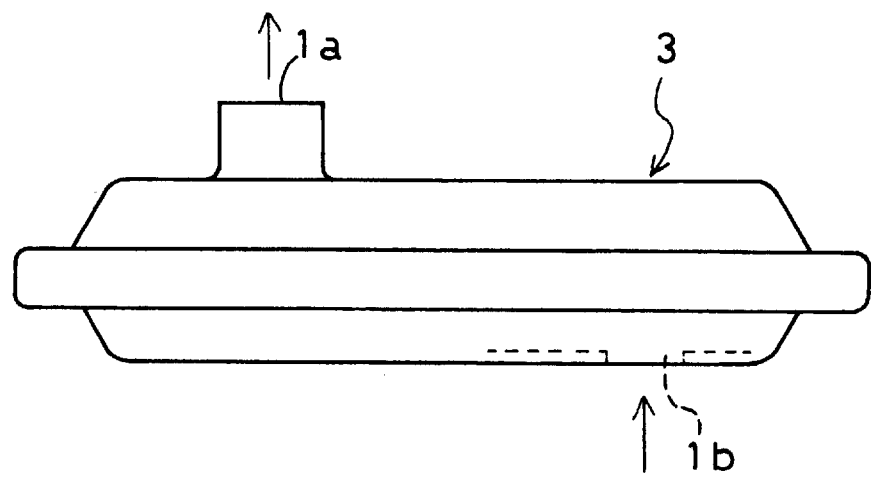
FIG. 6 is a side view of a conventional filter.
Figure 7:
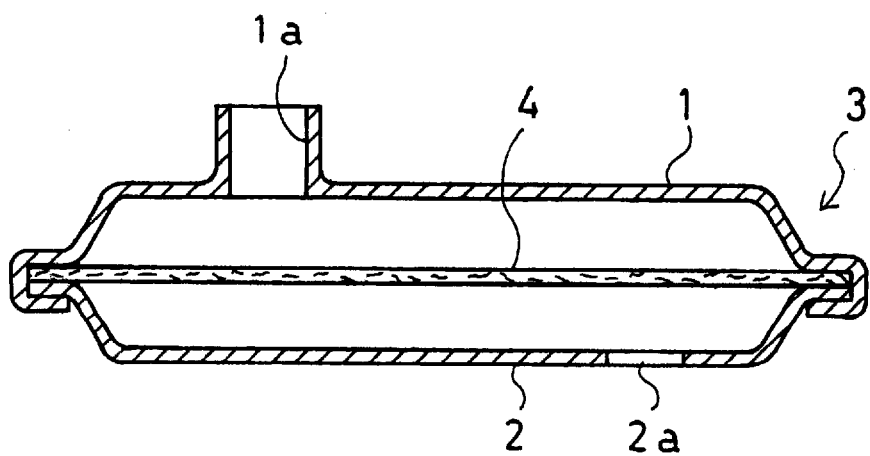
FIG. 7 is a sectional view of the conventional filter.

The filter medium unit 20 is interposed between the upper and lower casings 11 and 12. The filter medium 20 comprises a steel partition plate 21 and first and second filter media 22 and 23 disposed at both sides of the partition plate 21. The partition plate 21 has two pedestals 21a1 and 21a2 which are formed to protrude from the upper and lower sides thereof. Each of the pedestals 21a1 and 21a2 has a flat top. The pedestals 21a1 and 21a2 have central through holes 21b1 and 21b2 respectively. Two short cylindrical members 21c1 and 21c2 each formed of a steel plate are secured to the peripheral edges of the holes 21b1 and 21b2 respectively. Each of the cylindrical members 21c1 and 21c2 has a bent lower end or flange so as to have an L-shaped cross section and a cylindrical portion. The flanges of the cylindrical members are welded to the peripheral edges of the through holes 21b1 and 21b2 respectively. The first and second filter media 22 and 23 have respective communicating holes 22a and 23a each located to correspond to either one of the cylindrical members 21c1 and 21c2. The cylindrical portion of the cylindrical member 21c1 is inserted through the communicating hole 22a of the first filter medium 22, whereas the cylindrical portion of the cylindrical member 21c2 is inserted through the communicating hole 23a of the second filter medium 23. Each cylindrical portion is crimped outwardly so as to be fixed to the filter medium, as shown in FIG. 5. As a result, the first and second filter media 22 and 23 are fixed in position such that the peripheral edges of the communicating holes 22a and 23a thereof adhere closely to the peripheral edges of the through holes 21b1 and 21b2 respectively. The communicating hole 22a of the first filter medium 22 serves as a first communicating hole, and the through hole 21b1 of the partition plate 21 serves as a first through hole. The communicating hole 23a of the second filter medium 23 serves as a second communicating hole, and the through hole 21b2 of the partition plate 21 serves as a second through hole.

The partition plate 21 has the same configuration as the first and second filter media 22 and 23. The peripheral edges of the partition plate 21 and the first and second filter media 22 and 23 are dimensioned so as to be held between the flanges 11b and 12b of the upper and lower casings 11 and 12. Accordingly, when the upper and lower casings 11 and 12 are located to face each other with the filter medium unit 20 being interposed therebetween, the peripheral edges of the partition plate 21, first and second filter media 22 and 23 are held between the flanges 11b and 12b of the upper and lower casings 11 and 12, thereby adhering closely to the flanges 11b and 12b. The partition plate 21 is formed with a number of downwardly protruding small protrusions 21d over the entire surface thereof.

Although the filter medium unit 20 is arranged as described above in the embodiment, it may be modified in various manners. For example, when the housing 10 is cylindrical, the filter medium unit 20 may be pushed into the housing along the inner circumferential surface thereof, provided that the filter medium unit 20 is disposed across the interior of the housing. Furthermore, the upper and lower casings may hermetically be fixed to both sides of the filter medium 20 respectively. Furthermore, three or more through holes may be formed in the partition plate 21 of the filter medium unit 20 although the partition plate 21 has two through holes 21b1 and 21b2 in the embodiment. In this case, the through holes need to be paired so that one of each pair is fixed to the peripheral edge of the first communicating hole of the first filter medium to adhere closely thereto, whereas the other of each pair is fixed to the peripheral edge of the second communicating hole of the second filter medium to adhere closely thereto.

The discrete short cylindrical member 21c is crimped for the fixing of the filter medium unit 20 in the embodiment. A cylindrical member may be formed directly on the distal end of the pedestal 21a and crimped to fix the filter medium unit, instead. Furthermore, the filter medium unit 20 may be bonded, or fixed by welding when the pedestal is formed of a resin. However, the first and second filter media 22 and 23 can be rendered thinner than the partition plate 21 when the discrete cylindrical member 21c is used for the fixing, of the filter media as described above. As a result, the cylindrical member can easily be crimped and the degree of adhesion can be improved.

Each of the first and second filter media 22 and 23 is formed into a flat shape. The filter media may be embossed, corrugated or waved, instead. Each of the filter media 22 and 23 needs to adhere, on the peripheral edge thereof, closely to the partition plate 21. In the embodiment, the peripheral edges of the filter media are held between the upper and lower casings 11 and 12 together with the peripheral edge of the partition plate 21. The peripheral edges of the filter media may be bonded or welded to the partition plate 21, instead. In this case, the peripheral edge of the first filter medium 22 to be caused to adhere closely to the partition plate needs to encompass at least the second through hole 21b2, whereas that of the second filter medium 23 needs to encompass at least the first through hole 21b1 of the partition plate 21. Accordingly, the peripheral edge of each filter medium need not correspond with that of the partition plate 21. However, a larger filtration area can be obtained when the peripheral edge of each filter medium corresponds with that of the partition plate 21. Furthermore, the filter medium unit 20 can be treated as a single unit when the first and second filter media 22 and 23 are individually fixed to the partition plate 21. Consequently, the assembly efficiency can be improved. Furthermore, the filter medium unit 20 disposed across the communicating path can be rendered replaceable when detachably inserted into the cylindrical housing from its side.

The protrusions 21d formed on the partition plate 21 are provided for preventing the side of either filter medium opposed to the inlet port from sticking to the partition plate 21. Although the shown protrusions are semispherical, the partition plate 21 may be ridged up or waved, instead, provided that a flow path is defined between the partition plate and either filter medium. Furthermore, spacers may be interposed between the partition plate 21 and either filter medium. Additionally, the semispherical small protrusions 21d may protrude downwardly in the embodiment. The protrusions 21d thus need to be located at the same side as the inlet 12a of the housing 10. The protrusions are formed on the partition plate 21 to protrude upwardly when the inlet is formed in the upper face of the housing 10.

The operation of the filter will be described. The filter as constructed above is disposed in an oil pan in an automobile automatic transmission, for example. The outlet 11a formed in the upper casing 11 is connected to an oil pump (not shown). Upon start of an engine, the oil pump is driven so that fouled oil in the oil pan is drawn through the inlet 12a of the lower casing 12 into the housing 10 of the filter. The drawn oil passes through the filter medium unit 20 interposed between the upper and lower casings 11 and 12. There are two flow paths for the drawn oil. One of the flow paths is shown by arrows A in FIG. 2. The oil passes through the second through hole 21b2 of the partition plate 21 and thereafter passes through the first filter medium 22. The other flow path is shown by arrows B in FIG. 2. The oil first passes through the second filter medium 23 and then passes through the first through hole 21b1 of the partition plate 21. In each route, the oil passes through either one of the first and second filter media 22 and 23 while passing through the filter medium unit 20. These filter media are laid on both sides of the partition plate 21 respectively so as to constitute a single filter medium unit 20. Since the oil passes through either filter medium, the filtration area is approximately twice as large as the sectional area of the housing 10.

According to the above-described embodiment, the peripheral edges of the communicating holes 22a and 23a formed in the first and second filter media 22 and 23 are closely attached to the peripheral edges of the through holes 21b1 and 21b2 formed in the partition plate 21, respectively. The peripheral edges of both filter media 22 and 23 are held between the upper and lower casings 11 and 12 together with the peripheral edge of the partition plate 21 so as to be closely attached to the peripheral edges of the casings. Having passed through the through hole 21b1 without passing through the first filter medium 22, the oil passes through the second filter medium 23. Having passed through the through hole 21b2 without passing through the second filter medium 23, the oil passes through the first filter medium 22. The oil thus passes through either one of the two filter media disposed across the communicating path in the housing 10. Consequently, since a double filtration area is obtained, the life period of the filter can be improved.

Figure 8:
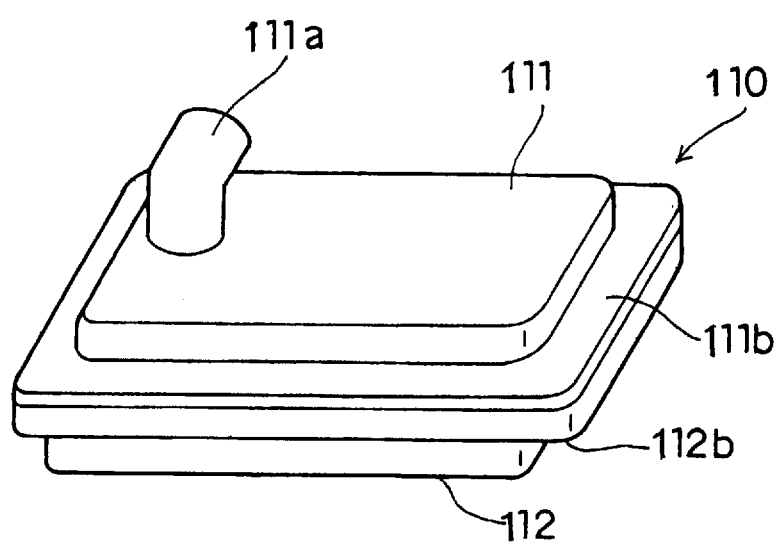
FIG. 8 is a perspective view of a filter of a second embodiment in accordance with the present invention.
Figure 9:
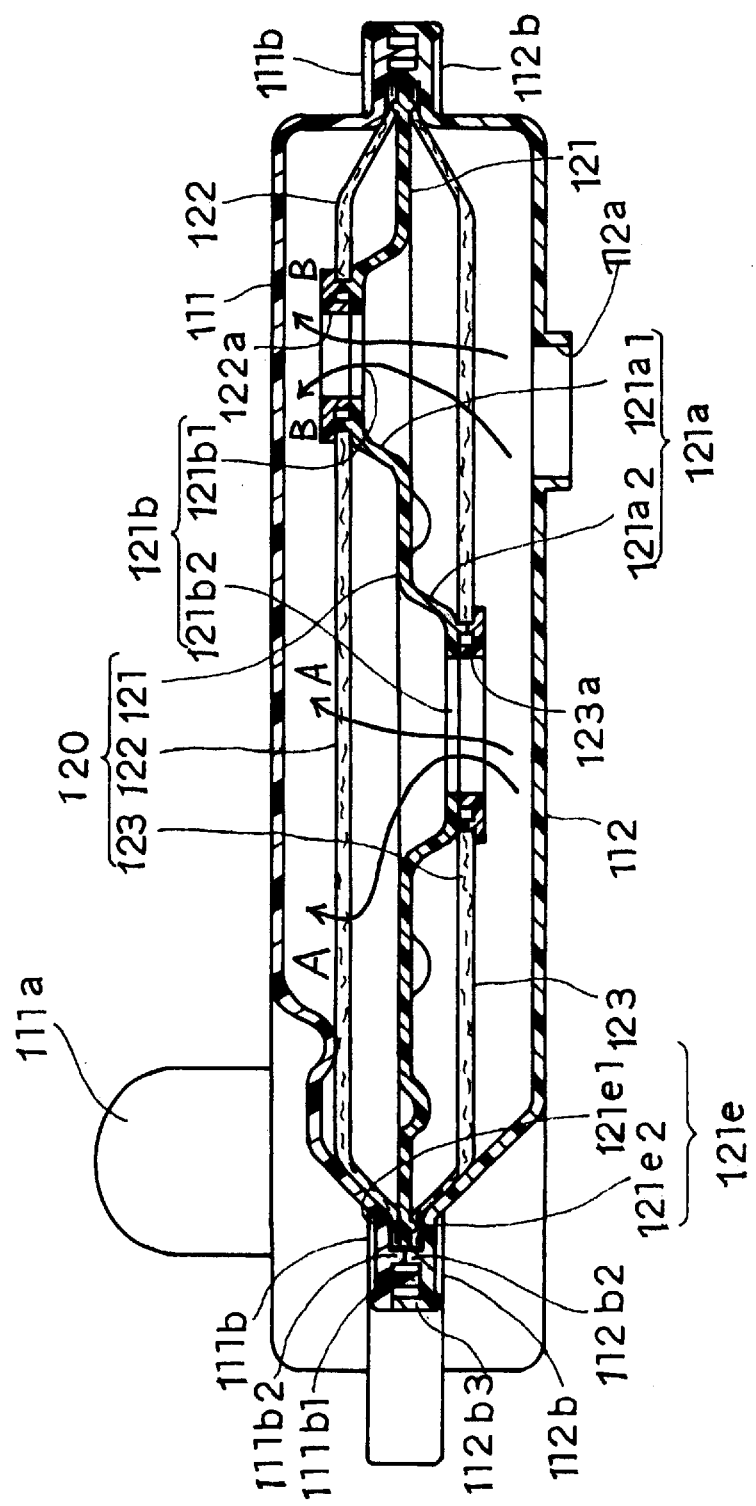
FIG. 9 is a partially broken sectional view of the filter.

FIGS. 8 to 13 illustrate a second embodiment of the present invention. Referring to FIG. 8, the filter of the second embodiment is shown. A resin housing 110 of the filter comprises upper and lower casings 111 and 112 each formed into the shape of a shallow dish. The casings 111 and 112 are connected together so that the housing 110 has a hollow interior. The upper and lower casings 111 and 112 are formed with outlet and inlet ports 111a and 112a respectively. A continuous communicating path is provided between the inlet and outlet ports 112a and 111a in the housing 110. The lower casing 112 has a flange 112b which is formed on a peripheral edge thereof to extend outwardly in a coplanar relation with an open end face thereof. The upper casing 111 also has a flange 111b formed in the same manner as the flange 112b. The flanges 111b and 112b are hermetically secured together by a vibration welding as will be described later.

Figure 11:
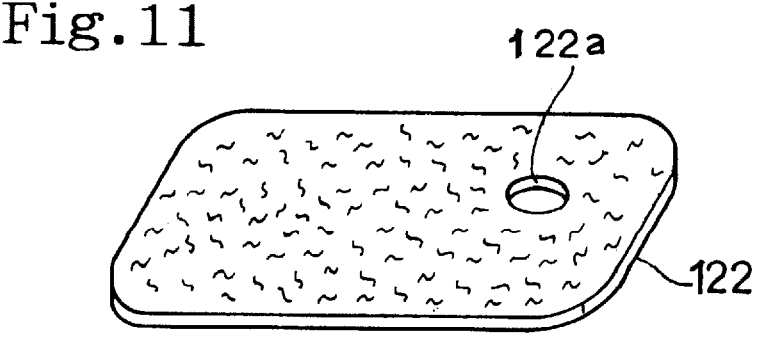
FIG. 11 is an exploded perspective view of the filer medium unit used in the filter.
Figure 11:
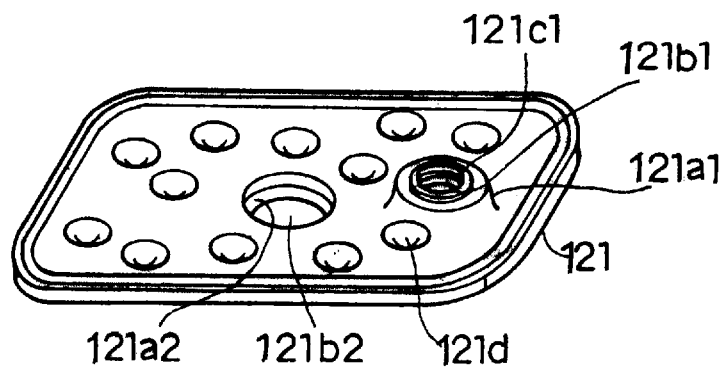
Figure 11:
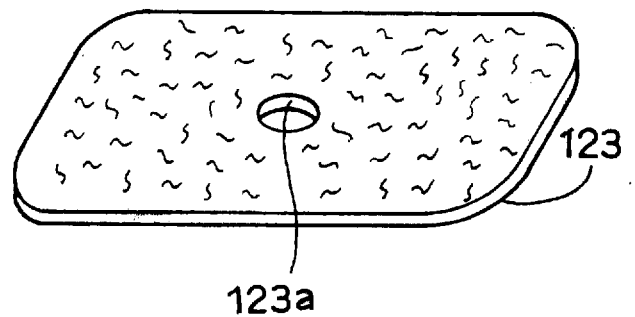
Figure 12:
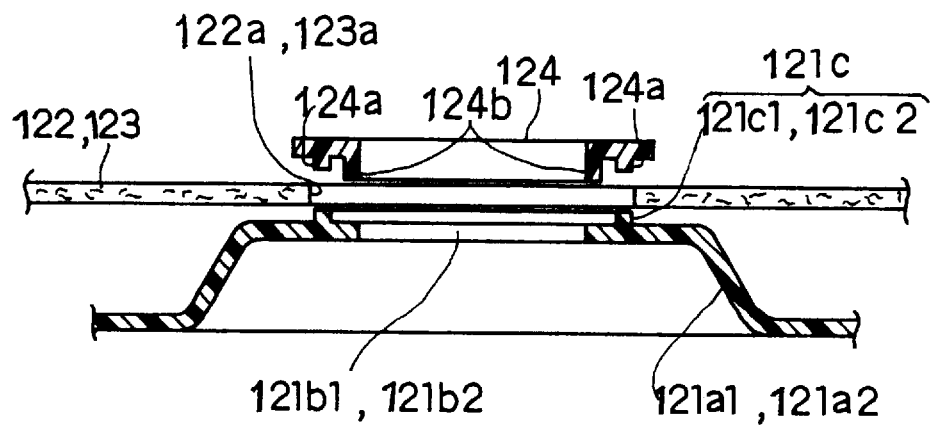
FIG. 12 is a sectional view of the filter medium, showing a welding step for a pedestal thereof.
Figure 13:
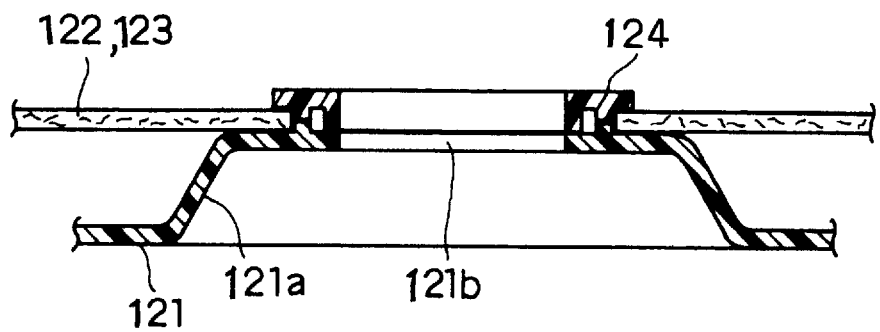
FIG. 13 is a sectional view of the filter medium, showing a welded pedestal.

Although the two shallow dish shaped casings 111 and 112 form the hollow housing 110 in the embodiment, a cup-shaped casing and a lid may be used for the casings, instead, provided that a continuous flow path is defined in the housing. Furthermore, two cylindrical members may be connected together with open ends thereof facing each other. The number of each of the inlet 112a and outlet 111a may be increased. Each of the inlet and outlet ports 112a and 111a may be formed into the shape of a pipe. The outlet port 111a may have a flat outer end. Furthermore, the inlet port 112a and the outlet port 111a need not be formed in the lower and upper casings 112 and 111 respectively. The locations of the inlet and outlet ports may be changed depending upon a direction of filtration. Additionally, an amount of oil used can be reduced when the locations of the inlet and outlet ports correspond to the lowermost of the bottom of an oil tank in which the filter is accommodated The filter medium unit 120 is interposed between the upper and lower casings 111 and 112. The filter medium 120 comprises a resin holding or partition plate 121 and first and second filter media 122 and 123 disposed at both sides of the holding plate 121, as shown in FIG. 11. The holding plate 121 has two pedestals 121a1 and 121a2 which are formed to protrude from the upper and lower sides thereof. The pedestals 121a1 and 121a2 have central through holes 121b1 and 121b2 and annular protruding plates 121c1 and 121c2 formed on the tops thereof circumferentially inwardly of the through holes 121b1 and 121b2, respectively, as shown in FIG. 12.

The first and second filter media 122 and 123 have respective communicating holes 122a and 123a located to correspond to the respective through holes 121b1 and 121b2. The plate 121c1 of the holding plate 121 is inserted into the communicating hole 122a of the first filter medium 122, whereas the plate 121c2 of the holding plate 121 is inserted into the communicating hole 123a of the second filter medium 122. The plates 121c1 and 121c2 extend out of the communicating holes 122a and 123a respectively when the first and second filter media 122 and 123 are placed on the pedestals 121a1 and 121a2 respectively. Two annular welding plates 124 are fixed to the plates 121c1 and 121c2 by the vibration welding, respectively, so that the first and second filter media 122 and 123 are closely fixed to the holding plate 121.

Each of the welding plates 124 is formed into an annular shape having an outer edge with a diameter larger than that of each of the plates 121c1 and 121c2 and an inner edge with a diameter smaller that of each of the through holes 121b1 and 121b2. The welding plates 124 have low plates 124a located to be opposed to the plates 121c1 and 121c2 and high plates 124b protruding toward the pedestals 124b from the inner edges, respectively. Each high plate 124b is formed so as not to reach the surface of the pedestal 121a when the plates 121c and 124a are opposed to each other.

Frictional heat melts down the plates 121c1 and 121c2 when the welding plates 124 are vibrated, pushed against the respective pedestals 121a1 and 121a2. The deposition plates 124 come closer to the pedestals 121a1 and 121a2 such that the first and second filter media 122 and 123 are pressed to thereby be fixed to the respective pedestals 121a1 and 121a2. The high walls 124b of the welding plates 124 are abutted against the respective pedestals 121a1 and 121a2 upon completion of the vibration welding.

The holding plate 121 has the same peripheral extent as the first and second filter media 122 and 123. The peripheral edges of the holding plate 121 and the filter media 122 and 123 are dimensioned so as to be held between the flanges 111b and 112b of the upper and lower casings 111 and 112. Accordingly, when the upper and lower casings 111 and 112 are located to face each other with the filter medium unit 120 being interposed therebetween, the peripheral edges of the holding plate 121, first and second filter media 122 and 123 are held between the flanges 111b and 112b of the upper and lower casings 111 and 112. Since the holding plate 121 is held between the first and second filter media 122 and 123, these filter media are not in direct contact with each other. The holding plate 121 is formed with a number of downwardly protruding small protrusions 121d over the entire surface thereof.

Figure 10:
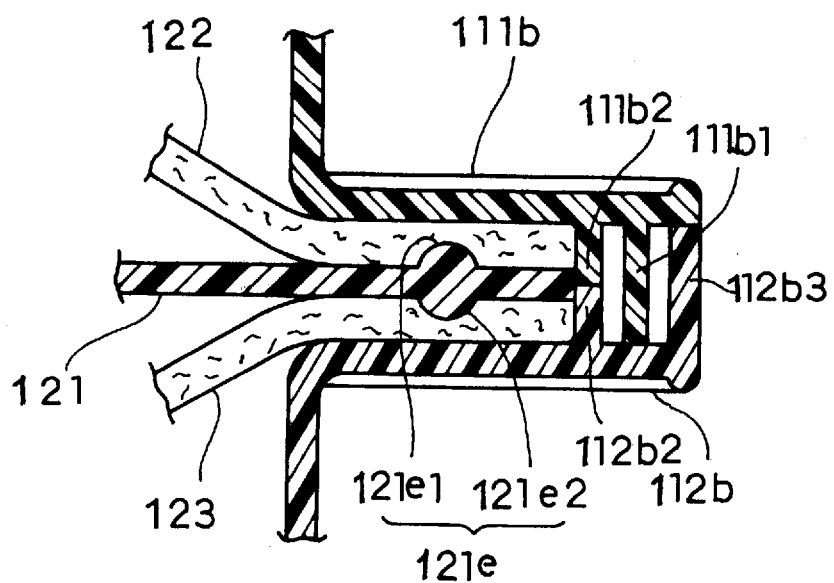
FIG. 10 is a sectional view of an edge portion of the filter.

The flanges 111b and 112b of the upper and lower casings 111 and 112 each have a slightly larger diameter than the peripheral edge of the filter medium unit 120, so that the casings are fixed together at the flanges 111b and 112b by the vibration welding as in the opposite faces of the welding plates 124 and the pedestals 121a. More specifically, the flange 111b of the upper casing 111 has a plate 111b1 formed on the radially midway portion thereof and another plate 111b2 formed inwardly of the plate 111b1, as shown in FIG. 10. The flange 112b of the lower casing 112 has a plate 112b2 located to be opposed to the plate 111b2 of the upper casing 111. The flange 112b further has another plate 112b3 formed on its outermost edge. When the flanges 111b and 112b are located to be opposed to each other, the plate 111b1 of the upper casing 111 abuts against the flange 112b of the lower casing 112 such that a space is defined between the inner plates 111b2 and 112b2 and such that the outward plate 112b is not abutted against the flange 111b. When pressure and vibration are applied to the flanges 111b and 112b, the midway plate 111b1 and the flange 112b are rubbed against each other to thereby generate frictional heat, which heat gradually melts the plate 111b1 and the flange 112b such that both are fixed together.

In the above-described vibration deposition, a portion of the first filter medium 122 inside the plate 111b2 is pushed at its upper side against the flange 111b, whereas a portion of the second filter medium 123 inside the plate 112b2 is pushed at its lower side against the flange 112b. Accordingly, the vibration is applied to the filter media 122 and 123 while they are held between the holding plate 121 and the flanges of the casings, so that the filter media are gradually pushed against the flanges of the casings.

On the other hand, the first and second filter media are in direct contact with each other in the prior art. Accordingly, applied vibration acts so that the filter media are pushed and rubbed against each other, resulting in fibrous fuzz of both filter media. The fuzz results in scattering of fibers. Furthermore, the strength in the peripheral edge of each filter medium held between the flanges 111b and 112b is lowered. As a result, the life period of the prior art filter needs to be set to be shorter than the original one determined according to the strength in the other portions of the filter.

In the embodiment, however, the holding plate 121 is interposed between the first and second filter media 122 and 123. Accordingly, since the filter media are not in direct contact with each other, the fuzz can be prevented. Furthermore, an amount of movement of each filter medium due to vibration of each of upper and lower sides is one half, whereuopn the fuzz can also be prevented and damage to the fibers can be reduced.

Figure 14:
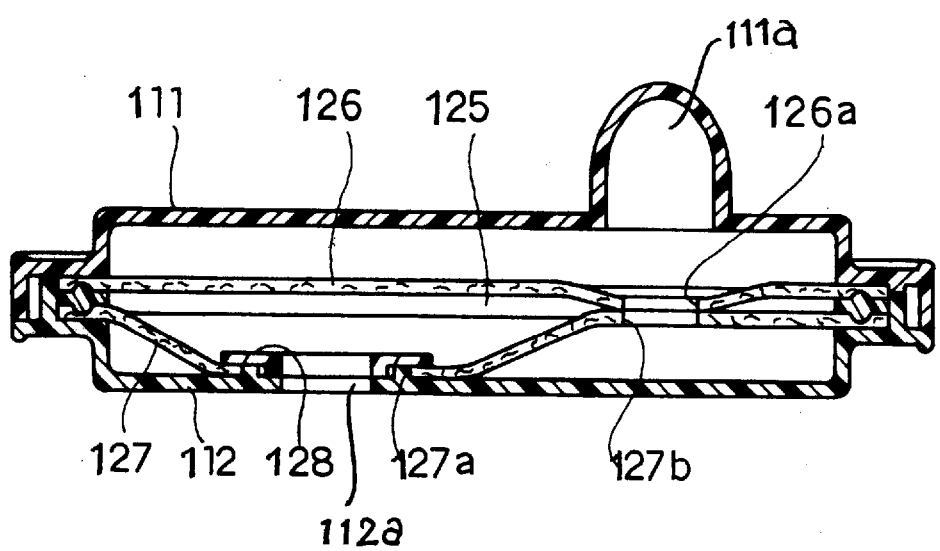
FIG. 14 is a perspective view of the filter of a modified form.
Figure 15:
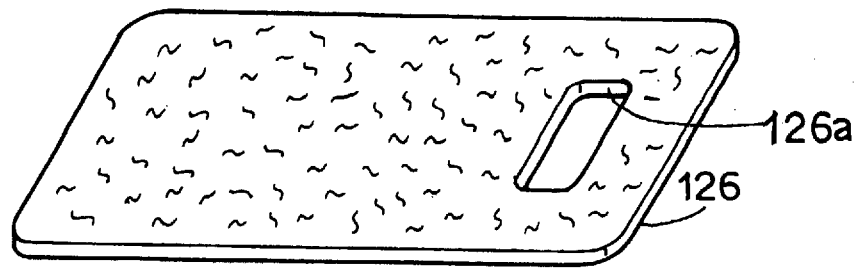
FIG. 15 is an exploded perspective view of the filter medium unit used in the modified form of filter.
Figure 15:
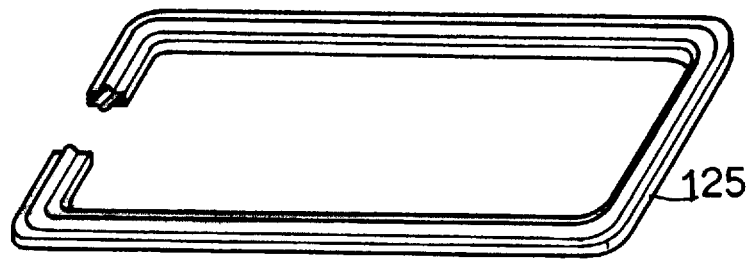
Figure 15:
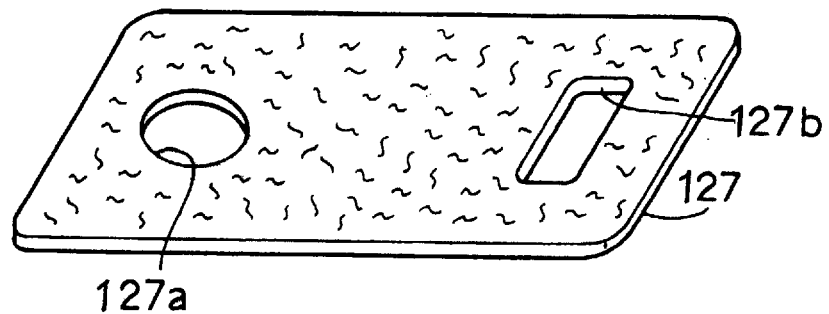

The holding plate 121 extends across the interior of the housing 110 in the embodiment. The holding plate needs to be interposed at least between the peripheral edges of the filter media 122 and 123. FIGS. 14 and 15 illustrate a modified form of the holding plate. As shown, the holding plate 125, rather than partitioning the housing is formed into the shape of a frame and held between the peripheral edges of the first and second filter media 126 and 127. The second filter medium 127 has a through hole 127a formed to correspond to the inlet 112a of the lower casing 112. The second filter medium 127 is fixed at the periphery of the through hole 127a to the periphery of the inlet 112a of the lower casing 112 by the deposition plate 128. The first and second filter media 126 and 127 have through holes 126a and 127b formed to be opposed to each other, respectively. Peripheral edges of the through holes 126a and 127b are bonded together. In this construction, too, when the upper and lower casings 111 and 112 are located to face each other with the filter medium unit 120 being interposed therebetween, the peripheral edges of the holding plate 125, first and second filter media 126 and 127 are held between the flanges 111b and 112b of the upper and lower casings 111 and 112. Accordingly, since the filter media 126 and 127 are not in direct contact with each other, the fuzz can be prevented when the vibration welding is carried out.

Furthermore, the holding plate 121 has two annular ribs 121e1 and 121e2 formed on both sides of the peripheral edge thereof respectively, as shown in FIG. 10. The ribs 121e1 and 121e2 bite into the first and second filter media 122 and 123 respectively when the peripheral edges of the filter media are held between the flanges 111b and 112b. As a result, the filter media can securely be fixed.

Figure 16:
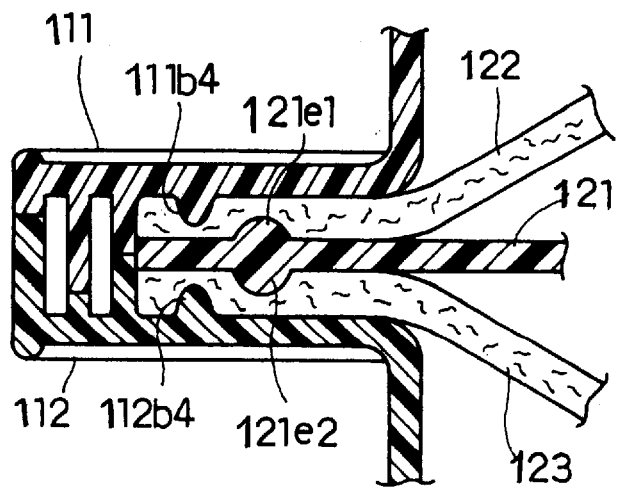
FIG. 16 is a sectional view of an edge portion of the filter of another modified form.

The ribs 121e1 and 121e2 are formed only on the holding plate 121 in the embodiment. As shown in FIG. 16, the flanges 111b and 112b of the casings 111 and 112 are also formed with ribs 111b4 and 112b4 as well as the ribs formed on the holding plate 121. In this case, the filter media can further be prevented from falling off. Furthermore, when concavities are formed in the flanges 111b and 112b and/or the holding plate 121, corners of the concavities bite into the filter media. A number of small protrusions may be formed, instead of the ribs. When the flanges 111b and 112b and the peripheral edge of the holding plate 121 are rugged, meshing engagement prevents the filter media from falling off in a most effective manner.

Figure 17:
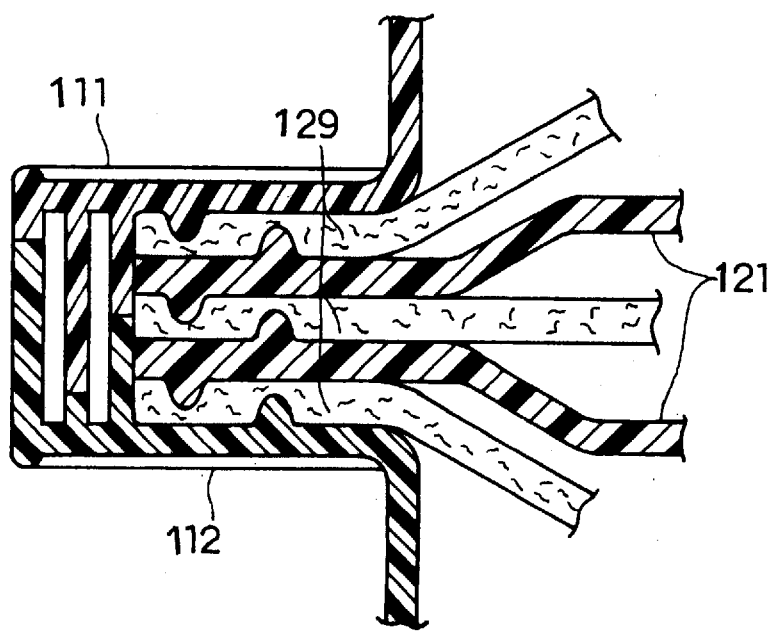
FIG. 17 is a sectional view of an edge portion of the filter of further another modified form.
Figure 18:
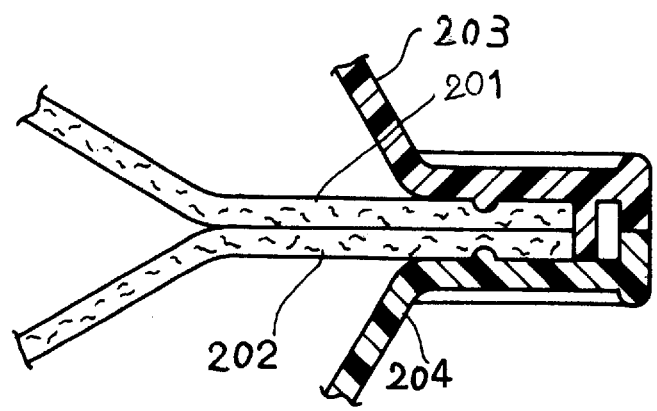
FIG. 18 is a sectional view of an edge portion of a conventional filter.

A single holding plate 121 need not be interposed between the two filter media, provided that the filter media are not in direct contact. In further another modified form as shown in FIG. 17, three filter media 129 are used and two holding plates are interposed between the filter media.

The operation of the filter of the second embodiment will be described. The filter as constructed above is disposed in an oil pan in an automobile automatic transmission, for example. The outlet 111a formed in the upper casing 111 is connected to an oil pump (not shown). Upon start of an engine, the oil pump is driven so that fouled oil in the oil pan is drawn through the inlet 112a of the lower casing 112 into the housing 110 of the filter. The drawn oil passes through the filter medium 120 interposed between the upper and lower casings 111 and 112. There are two flow paths of the drawn oil. One of the flow paths is shown by arrows A in FIG. 9. The oil passes through the second through hole 121b2 of the holding plate 121 and thereafter passes through the first filter medium 122. The other flow path is shown by arrows B in FIG. 9. The oil first passes through the second filter medium 123 and then passes through the first through hole 121b1 of the holding plate 121. In each route, the oil passes through either one of the first and second filter media 122 and 123 while passing through the filter medium unit 120. These filter media are laid on both sides of the holding plate 121 respectively so as to constitute a single filter medium 120. Since the oil passes through either filter medium, the filtration area is approximately twice as large as the sectional area of the housing 110. The second filter medium 123 is pushed against the holding plate 121 when the oil flows through the paths shown by arrows B in FIG. 9. The small protrusions 121d can prevent the second filter medium 123 from sticking to the holding plate 121.

In the construction shown in FIG. 14, the oil drawn in through the inlet 112a flows into a space between the first and second filter media 122 and 123. Then, the oil, having passed through the upper first filter medium 122, flows to the outlet 111a. The oil, having passed through the lower second filter medium 123, flows upwardly through the through holes 126a and 127b to the outlet 111a.

According to the second embodiment, the rectangular, shallow dish shaped upper and lower casings 111 and 112 having the outlet 111a and the inlet 112a respectively are placed to be opposed to each other with the open ends facing each other. The peripheral edges of the filter media 122 and 123 are held between the flanges 111b and 112b of the casings 111 and 112 for the vibration welding. Since the holding plate 121 is interposed between the filter media 122 and 123, the filter media are not in direct contact with each other even when the flanges are subjected to vibration. Furthermore, the fuzz can be prevented and damage to the fibers can be reduced.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A filter including a pair of casings defining a housing containing a filter medium unit disposed across the interior thereof, the casings of said housing each containing an opening defining a communicating path, the filter comprising a partition plate having oppositely facing surfaces interposed between the casings and having a pair of through-holes, the filter medium unit including a first filter medium having an interior surface adjacent one of said oppositely facing surfaces of the partition plate and having a through-hole registering with one of the through-holes on the plate and a second filter medium having an interior surface adjacent the other side of said oppositely facing surfaces of the partition plate and having a through-hole registering with the other through-hole in the plate, wherein a filtering portion of the interior surface of said first filter medium is spaced apart from said one of said oppositely facing surfaces of the partition plate and a filter portion of the interior surface of said second filter medium is spaced apart from said other one of said oppositely facing surfaces of the partition plate.

2. A filter comprising:
a housing including a pair of generally box-shaped casings having outlet and inlet ports respectively defining a flow path therebetween, and oppositely facing open ends connected together by means of a vibration welding;
a plurality of filter media sheets having peripheral surface portions held between the open ends of the casings so as to be disposed across the flow path;
a plurality of generally mutually spaced partition plates each having a first side facing in a first direction and a second side facing in a second direction opposite said first direction, said partition plates each containing through-holes and having peripheral surfaces disposed between the peripheral portions of the respective filter media sheets;
wherein each of said partition plates includes pedestals having through-holes communicating with said through-holes in said partition plates and extending from said first and second sides thereof;
through-holes in said filter media sheets; and
means on said pedestals for securing said through-holes in said filter media sheets in registry with said through-holes in said pedestals, and placing filtering portions of said filter media sheets in spaced relation with respect to the sides of said partition plates.

3. A filter according to claim 2, wherein the peripheral surfaces of each partition plate are formed with ribbed portions at portions thereof facing the filter media respectively.

4. A filter according to claim 2 or claim 3, wherein the peripheral surfaces of each partition plate and a peripheral flange of each casing having cooperating surfaces formed with ribbed portions for preventing detachment of each filter medium.

5. A filter comprising:
a generally box-shaped housing including a pair of casings each having a concavity and a peripheral edge extending around each concavity, the peripheral edges of said casings being defined by an offset flange portions with the flange portion of one of said casings being formed to substantially enclose the flange portion of said other casing so as to retain said casings in facing relation to define the interior of said housing;
a filter medium unit including:
a partition plate having a pair of opposite sides and a peripheral edge interposed between said offset flange portions of said casing to divide the interior of said housing into a pair of separate chamber portions, said partition plate having a plurality of mutually spaced pedestals each defining a respective through-opening projecting from opposite sides of said plate into the adjacent chamber portions, wherein said pedestals projecting from one of the opposite sides of said partition plate project into one of said chamber portions, and pedestals projecting from the other of said opposite sides of said partition plate project into the other of said chamber portions, and
a pair of sheets of filter media having their peripheral edges retained by the flange portions of said casings, one of said sheets of filter media being disposed in one of said chamber portions and the other of said sheets of filter medium being disposed in the other one of said chamber portions, wherein each sheet of filter medium includes a through-hole containing an edge for reception on a respective said pedestal in concentric disposition about the respective pedestal through-opening;
means on said pedestals for securing said through-holes in said filter media sheets in registry with said through-openings in said pedestals, and placing filtering portions of said filter media sheets in spaced relation with respect to the sides of said partition plate; and means forming an inlet hole in one of said casings and an outlet hole in the other of said casings to define a fluid flow path through the housing.

6. A filter medium unit for disposition across a fluid flow path through a housing, said filter medium unit comprising:

a partition plate having a first side facing a first direction and a second side facing a second direction opposite to said first direction, each side containing a respective peripheral surface, and a pair of mutually spaced pedestals each defining a respective through-opening, wherein one of said pedestals projects outwardly from said first side in said first direction, and the other one of said pedestals projects outwardly from said second side in said second direction, and a pair of sheets of filter media, one of said sheets of filter media having a peripheral surface adhering to the peripheral surface on the first side of said partition plate and the other of said sheets of filter media having a peripheral surface adhering to the peripheral surface on the second side of said partition plate, each of said sheets of filter media being attached to one of said pedestals and containing a through-hole concentrically attached to said pedestal about the through-opening therein; and means on said pedestals for securing said through-holes in said filter media sheets in registry with said through-openings in said pedestals, and placing filtering portions of said filter media sheets in spaced relation with respect to the sides of said partition plate.

* * * * *